(12) United States Patent
Carrender et al.

(10) Patent No.: US 7,580,378 B2
(45) Date of Patent: Aug. 25, 2009

(54) DISTANCE/RANGING DETERMINATION USING RELATIVE PHASE DATA

(75) Inventors: Curtis Lee Carrender, Morgan Hill, CA (US); John M. Price, Morgan Hill, CA (US)

(73) Assignee: Alien Technology Corporation, Morgan Hill, CA (US)

( * ) Notice: Subject to any disclaimer, the term of this patent is extended or adjusted under 35 U.S.C. 154(b) by 722 days.

(21) Appl. No.: 11/080,379

(22) Filed: Mar. 14, 2005

(65) Prior Publication Data

US 2005/0237953 A1  Oct. 27, 2005

Related U.S. Application Data

(63) Continuation-in-part of application No. 09/588,998, filed on Jun. 6, 2000, now Pat. No. 6,868,073.

(51) Int. Cl.
H04B 7/005 (2006.01)
(52) U.S. Cl. .................. 370/278; 370/282; 370/313
(58) Field of Classification Search .................. None
See application file for complete search history.

(56) References Cited

U.S. PATENT DOCUMENTS

| 3,098,971 | A |   | 7/1963  | Richardson          |
|-----------|---|---|---------|---------------------|
| 3,299,424 | A |   | 1/1967  | Vinding             |
| 4,075,632 | A |   | 2/1978  | Baldwin et al.      |
| 4,087,816 | A |   | 5/1978  | Barszczewski et al. |
| 4,283,726 | A | * | 8/1981  | Spence et al. ...... 342/458 |
| 4,360,810 | A |   | 11/1982 | Landt               |
| 4,728,955 | A |   | 3/1988  | Hane                |
| 4,851,851 | A |   | 7/1989  | Hane                |
| 5,298,904 | A |   | 3/1994  | Olich               |
| 5,510,795 | A |   | 4/1996  | Koelle              |
| 5,528,232 | A |   | 6/1996  | Verma et al.        |
| 5,790,022 | A |   | 8/1998  | Delvecchio et al.   |
| 6,084,512 | A |   | 7/2000  | Elberty et al.      |
| 6,501,807 | B1|   | 12/2002 | Chieu et al.        |
| 2003/0058155 | A1 | | 3/2003 | Landt               |

(Continued)

FOREIGN PATENT DOCUMENTS

EP   0 851 239 A1   7/1998

(Continued)

OTHER PUBLICATIONS

Notification of Transmittal of the International Search Report and The Written Opinion of the International Searching Authority or the Declaration, PCT international Search Report, PCT Application No. PCT US2006/008611. Jul. 17, 2006 Mailed Nov. 11, 2005 (15 pages).

(Continued)

Primary Examiner—Frank Duong
(74) Attorney, Agent, or Firm—Blakely, Sokoloff, Taylor & Zafman LLP

(57) ABSTRACT

A method and system for locating an RF transponder based on phase differences between signals received from the RF transponder. The method includes receiving a signal from the transponder and calculating distance, relative movement, and position by comparing I-Q phase angle vectors of the signals. Global scroll commands can be used following receipt of signals at first and second frequencies to quickly determine distance.

26 Claims, 12 Drawing Sheets

U.S. PATENT DOCUMENTS

2004/0196177 A1    10/2004    Billington et al.

FOREIGN PATENT DOCUMENTS

| WO | WO 01/94974 | 12/2001 |
|---|---|---|
| WO | WO 01/95240 | 12/2001 |

OTHER PUBLICATIONS

Notification Concerning Transmittal of International Preliminary Report on the Patentability (Chapter 1 of the Patent Cooperation Treaty) and Written Opinion of the International Searching Authority for PCT Application No. PCT US2006/008611, filed on Mar. 10, 2006, mailed Sep. 27, 2007, (11 pages).

PCT Written Opinion of the International Searching Authority UPCT/US2006/008611 mailed Apr. 14, 2008 (total 9 pages).

* cited by examiner

US 7,580,378 B2

DISTANCE/RANGING DETERMINATION USING RELATIVE PHASE DATA

The present patent application is a Continuation-In-Part (CIP) of application Ser. No. 09/588,998, filed Jun. 6, 2000, which is issued as U.S. Pat. 6,868,073 on Mar. 15, 2005.

BACKGROUND OF THE INVENTION

1. Field of the Invention

The present invention relates to radio frequency identification tags (RF tags), and in particular, to an RF communication system and method for locating RF tags utilizing relative phase information from multiple channels.

2. Description of the Related Art

Remote communication utilizing wireless equipment typically relies on radio frequency (RF) technology, which is employed in many industries. One application of RF technology is in locating, identifying, and tracking objects, such as animals, inventory, and vehicles.

RF identification (RFID) tag systems have been developed that facilitate monitoring of remote objects. As shown in FIG. 1, a basic RFID system 10 includes two components: an interrogator or reader 12, and a transponder (commonly called an RF tag) 14. The interrogator 12 and RF tag 14 include respective antennas 16, 18. In operation, the interrogator 12 transmits through its antenna 16 a radio frequency interrogation signal 20 to the antenna 18 of the RF tag 14. In response to receiving the interrogation signal 20, the RF tag 14 produces an amplitude-modulated response signal 22 that is transmitted back to the interrogator 12 through the tag antenna 18 by a process known as backscatter.

The conventional RF tag 14 includes an amplitude modulator 24 with a switch 26, such as a MOS transistor, connected between the tag antenna 18 and ground. When the RF tag 14 is activated by the interrogation signal 20, a driver (not shown) creates a modulating signal 28 based on an information code, typically an identification code, stored in a non-volatile memory (not shown) of the RF tag 14. The modulating signal 28 is applied to a control terminal of the switch 26, which causes the switch 26 to alternately open and close. When the switch 26 is open, the tag antenna 18 reflects a portion of the interrogation signal 20 back to the interrogator 18 as a reflected portion 30 of the response signal 22. When the switch 26 is closed, the interrogation signal 20 travels through the switch 26 to ground, without being reflected, thereby creating a null portion 32 of the response signal 22. In other words, the interrogation signal 20 is amplitude-modulated to produce the response signal 22 by alternately reflecting and absorbing the interrogation signal 20 according to the modulating signal 28, which is characteristic of the stored information code. The RF tag 14 could also be modified so that the interrogation signal is reflected when the switch 26 is closed and absorbed when the switch 26 is open. Upon receiving the response signal 22, the interrogator 18 demodulates the response signal 22 to decode the information code represented by the response signal.

The substantial advantage of RFID systems is the non-contact, non-line-of-sight capability of the technology. The interrogator 12 emits the interrogation signal 20 with a range from one inch to one hundred feet or more, depending upon its power output and the radio frequency used. Tags can be read through a variety of substances such as smell, fog, ice, paint, dirt, and other visually and environmentally challenging conditions where bar codes or other optically-read technologies would be useless. RF tags can also be read at remarkable speeds, in most cases responding in less than one hundred milliseconds.

A typical RF tag system 10 will contain a number of RF tags 14 and the interrogator 12. There are three main categories of RF tags. These are beam-powered passive tags, battery-powered semi-passive tags, and active tags. Each operates in fundamentally different ways.

The beam-powered RF tag is often referred to as a passive device because it derives the energy needed for its operation from the interrogation signal beamed at it. The tag rectifies the field and changes the reflective characteristics of the tag itself, creating a change in reflectivity that is seen at the interrogator. A battery-powered semi-passive RFID tag operates in a similar fashion, modulating its RF cross section in order to reflect a delta to the interrogator to develop a communication link. Here, the battery is the source of the tag's operational power. Finally, in the active RF tag, a transmitter is used to create its own radio frequency energy powered by the battery.

The range of communication for such tags varies according to the transmission power of the interrogator 12 and the RF tag 14. Battery-powered tags operating at 2,450 MHz have traditionally been limited to less than ten meters in range. However, devices with sufficient power can reach up to 200 meters in range, depending on the frequency and environmental characteristics.

Although prior art communication systems can communicate with an RF tag that is within a certain distance of the interrogator (depending on the interrogator power), the interrogator cannot determine the location of the RF tag. For example, the prior art interrogator may be able to determine that there is an RF tag within 100 meters of the interrogator, but cannot determine whether it is 90 meters away or 45 meters away. In addition, the prior art interrogator cannot determine whether the RF tag is in front of, behind, or to either side of the interrogator. There are numerous applications for which such location information is important.

BRIEF SUMMARY OF THE INVENTION

Embodiments of the present invention are directed to a method and system for locating an RF transponder. In one embodiment the method includes transmitting from a source to a multi-channel receiver a signal that is processed to determine a phase difference and hence a distance, position, location, orientation, or relative movement, or combinations of the foregoing regarding the source. In another embodiment, an interrogator and a transponder in the form of an RF tag are provided, and the RF tag determines the phase difference of the signal or signals to determine a relationship between the tag and the interrogator. In a further embodiment, the interrogator determines a phase relationship of a multi-channel signal to determine the relationship, such as distance, position, location, or relative movement. Alternatively, the roles of the interrogator and RF tag are reversed.

The comparison and determination of a phase difference between the two signals are performed in one embodiment by phase locking the first signal to produce a reference signal. The reference signal is then mixed with the second signal to produce a mixed signal. A counter determines the phase difference by counting the number of nulls or peaks in the mixed signal, the nulls corresponding to respective portions of the signals that are of opposite phase to each other and the peaks corresponding to respective portions of the signals that are in phase with each other. The number of nulls or peaks within a period is directly related to the distance between the interrogator and the RF tag. In a preferred embodiment, the second signal is a frequency modulated signal that includes plural frequency portions each at different frequencies and the counter counts nulls or peaks in plural different mixed signals produced by mixing the respective frequency portions with the reference signal.

In accordance with another embodiment of the invention, a multi-channel interrogator or receiver can be used where the phase information relative between multiple channels can be used with two or more successive readings in time or in frequency or in relative distance to determine a real distance, a position, and movement of a tag. Moreover, the system can be used to determine if a multi-path null has occurred to decide to use or not to use this information when determining distance by other means. In addition, other information can be used such as a null in either direction, field strength estimation, backscatter intensity, and ramping power to determine relative distance. In addition, two or more successive readings in time or frequency or relative distance can be made of the phase information relative to multiple channels to determine the relative field in front of a reader antenna by having a tag of known position modulate or having an antenna of known position modulate. Moreover, a combination of the above is also provided where a tag is powered in the standard UHF fashion at a single frequency at a time and where a lower power signal that is spread spectrum in nature or UWB is used to take a near-instantaneous snapshot of the data showing quadrature nulls. The plot so taken can contain much if not all of the data for determining distance or position or delta in relation to the standard ranging position using quadrature nulls.

DETAILED DESCRIPTION OF THE INVENTION

Figure 2:
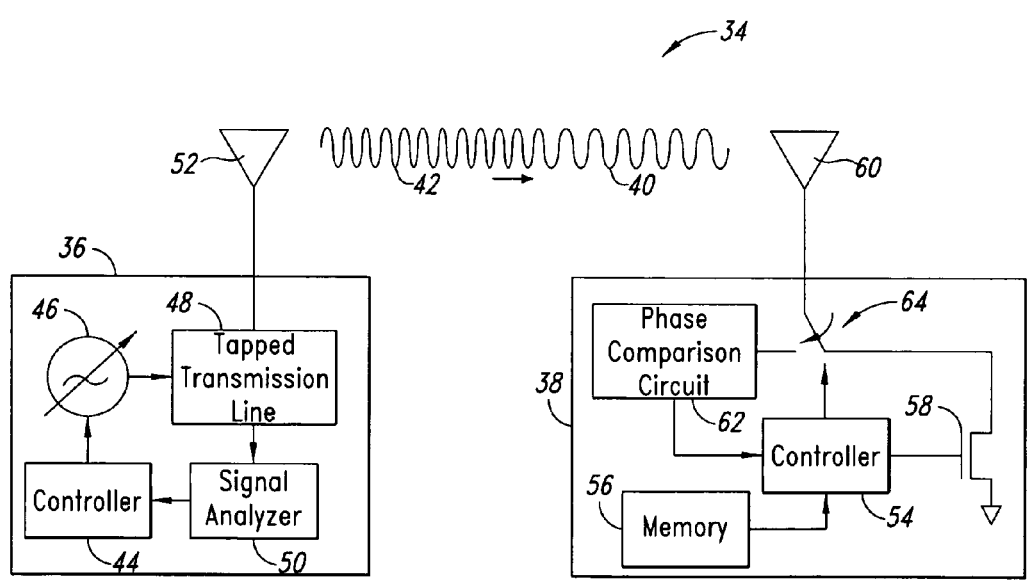
FIG. 2 is a schematic diagram of an RF communication system for locating an RF tag according to an embodiment of the present invention.

As shown in FIG. 2, an embodiment of the present invention is directed to an RF communication system 34 that determines a distance between a reader or interrogator 36 and an RF transponder or tag 38. The system 34 determines the distance by transmitting from the interrogator 36 to the RF tag 38 a first signal 40 at a first frequency and a frequency modulated second signal 42 at a second frequency. The RF tag 38 compares the signals 40, 42 and determines a phase difference between the two signals. The distance between the interrogator 36 and the RF tag 38 is directly related to that detected phase difference.

The interrogator 36 includes a controller 44, a variable signal source 46, a tapped transmission line 48, a signal analyzer 50, and an antenna 52. The controller 44 can be any general purpose processor, such as a known microprocessor, or can be specifically designed to control the operation of the interrogator 36 as described herein. Examples of the tapped transmission line 48 and signal analyzer 50 can be found in U.S. Pat. No. 4,360,810 to Landt, which is incorporated by reference herein in its entirety. The tapped transmission line 48 enables the single antenna 52 to be used to transmit and receive signals simultaneously. Of course other systems for receiving and decoding the response signal from the RF tag 38 could be employed, such as the system shown in U.S. Pat. No. 4,075,632, which is incorporated herein by reference.

The RF tag 38 includes a controller 54, a memory 56, a modulating switch 58, an antenna 60, a phase comparison circuit 62, and a mode switch 64. The controller 54 can be any general purpose processor, such as a known microprocessor, programmed to control the operation of the RF tag 38 as described herein or can be specifically designed to provide the control functions. The mode switch 64 alternately couples the antenna 60 to either the modulating switch 58 or the phase comparison circuit 62 under the control of the controller 54 as discussed in more detail below.

Stored in the memory 56 is an information code, such as an identification code that identifies the RF tag 38 or an object to which the RF tag is attached or both. Alternatively, the information code could represent numerous other pieces of information, such as the environmental conditions surrounding the RF tag 38, inventory information associated with the RF tag, or information that was previously written to the RF tag before or after the RF tag was placed into service. The memory 56 can be implemented with any type of memory, but preferably is non-volatile memory so that the information code is not lost when power is lost.

Figure 1:
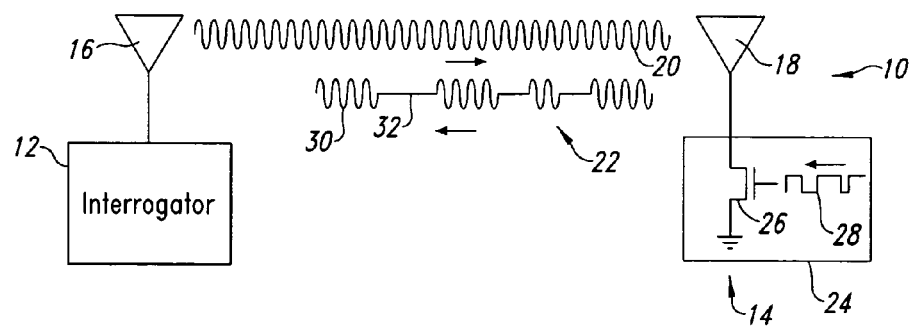
FIG. 1 is a schematic diagram of a prior art RF communication system employing amplitude-modulated backscatter signals.

During a tag identification mode, the interrogator 36 transmits a continuous wave interrogation signal to the RF tag 38 in an attempt to determine the identity of the RF tag. Based on the identification code stored in the memory 56, the controller 54 of the RF tag 38 creates a modulating signal that is applied to the modulating switch 58, which modulates the interrogation signal to produce a backscatter response signal that is transmitted back to the interrogator 36. The modulation of the interrogation signal can be amplitude-modulation as described above with respect to FIG. 1 or can be phase-modulation as described in U.S. patent application Ser. No. 09/588,997 entitled Phase Modulation in RF Tag, which was abandoned in favor or U.S. patent application Ser. No. 10/928,712 entitled Phase Modulation in RF Tag, which are incorporated herein by reference.

The response signal from the RF tag 38 is received by the interrogator 38 and mixed with the interrogation signal in the tapped transmission line 48. The tapped transmission line 48 and signal analyzer 50 combine to demodulate the response signal to determine the information code of the RF tag 38 and pass the information code to the controller 44. The controller 44 determines whether the information code is valid, and if so, transmits an acknowledgement signal to the RF tag 38.

After the interrogator 36 acknowledges receipt of the information code, the RF tag 38 switches into a distance determination mode by coupling the phase comparison circuit 62 to the antenna 60 via the mode switch 64. In the distance determination mode, the interrogator 36 transmits the first and second signals 40, 42 to the RF tag 38. In a preferred embodiment, the second signal 42 is transmitted after the first signal 40 is transmitted, but the signals could be transmitted simultaneously by separate antennas without departing from the invention. The controller 44 of the interrogator 36 can be programmed to cause the variable signal source 46 to transmit only the first signal 40 at the first frequency followed by the second signal 42 at the second frequency. Alternatively, the controller 44 can be programmed to cause the signal source 46 to transmit a frequency ramp that starts at the first frequency and includes the second frequency, that is, the first and second signals 40, 42 can be part of the frequency ramp. Or, the signal source 46 can randomly or pseudo-randomly changes frequencies to transmit the first and second signals 40, 42. The invention includes any combination of two or more frequencies.

The phase comparison circuit 62 of the RF tag 38 compares the signals 40, 42 and determines a phase difference between the two signals. The distance between the interrogator 36 and the RF tag 38 is directly related to that detected phase difference. The phase comparison circuit 62 passes to the controller 54 information indicative of the phase difference, which the controller can use to compute the distance between the interrogator 36 and the RF tag 38.

Figure 3:
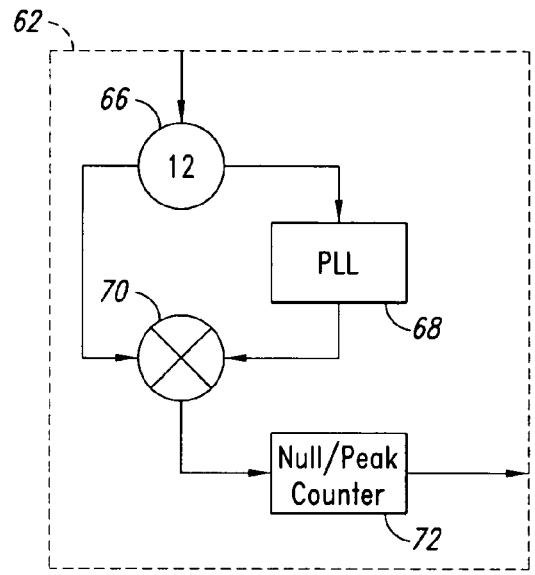
FIG. 3 is a schematic diagram of a phase comparison circuit employed in the system of FIG. 2.

Shown in FIG. 3 is a more detailed diagram of the phase comparison circuit 62 of the RF tag 38. The phase comparison circuit 62 includes a signal divider 66, phased lock loop 68, mixer 70, and null/peak counter 72. The signal divider 66 divides the incoming first signal 40 into two identical signals, one of which going to the phase lock loop 68. The phase lock loop 68 phase locks, and preferably amplitude locks, on the incoming signal to produce a reference signal that is substantially identical to the incoming first signal 40. The phase lock loop 68 preferably is selected to provide a robust phase lock with a long lock and hold capability. The reference signal is passed to the mixer 70, which also receives the other one of the signals from the signal divider 66 and produces a mixed output signal that is a combination of the two signals input to the mixer. Initially, the mixed output signal is a combination of the first signal 40 received from the signal divider 66 and the reference signal, which is substantially identical to the first signal 40, so the mixed output signal is equal to the first signal 40 except with larger peaks and valleys.

When the signal received by the phase comparison circuit 62 changes from the first signal 40 to the second signal 42, the mixer 70 receives at one input the second signal 42 from the signal divider 66 and at the other input the reference signal which is substantially identical to the first signal 40. The mixer 70 combines the second signal 42 with the reference signal, resulting in a mixed output signal with two frequency components. At regular points in time and space, the second signal 42 will be at a maximum while the reference signal is at a minimum, resulting in null points in the mixed output signal. Consecutive null points of the mixed output signal will be separated by peak points at which both the second and reference signals are at a maximum, or both are at a minimum. The null/peak counter 72 counts either the null points or the peak points in the mixed output signal and provides the resulting count to the controller 54. The null/peak counter 70 can be either an analog counter or can include an analog/digital converter and a digital signal processor to determine the count digitally.

In one embodiment, the frequencies of the first and second signals 40, 42 are known to the controller 54, and thus, the controller uses the count provided by the null/peak counter 72 to compute the distance between the interrogator 36 and the RF tag 38. Alternatively, the controller can incorporate the count into a count signal that is transmitted by the RF tag 38 back to the interrogator 36. The controller 44 would then use the count and the frequencies of the first and second signals 40, 42 to determine the distance between the interrogator 36 and the RF tag 38.

An example may help one to understand how the distance between the interrogator 36 and RF tag 38 can be determined. A first signal at 880 MHz has a wavelength of 34.0909091 cm and a second signal at 884 MHz has a wavelength of 33.9366516 cm. At a distance of about 37.5 meters (110 wavelengths of the first signal and 110.5 wavelengths of the second signal), the first and second signals will be 180 degrees out of phase, resulting in a null point in the mixed signal output by the mixer 70. At each additional 75 m, there will be an additional null point, and thus, the distance between the interrogator 36 and the RF tag 38 can be determined with an accuracy of +/−37 m using a first signal at 880 MHz and a second signal at 884 MHz.

The accuracy can be improved by using a frequency modulated second signal rather than keeping the second signal at only the second frequency. For example, assume the second signal includes a first portion at 883 MHz, a second portion at 884 MHz, and a third portion at 890 MHz. Mixing each of those portions of the second signal with the first signal results in first, second, and the mixed signals with nulls at distances of 50, 37.5, and 15 meters, respectively. Therefore, if the counter counts 1 null for each of the first and second mixed signals and 3 nulls for the third mixed signal, then the controller can determine that the distance between the interrogator 36 and RF tag 38 is between 50 and 60 meters. If the distance were less than 50 meters, then the first mixed signal would have had no nulls; and if the distance were more than 60 meters, then the third mixed signal would have had 4 nulls. Of course, with more than three frequency portions of the second signal, the accuracy of the distance determination can be improved further. Moreover, rather than comparing all frequency portions of the second signal to the first signal, one could compare some of the frequency portions with each other.

In one embodiment, the interrogator 36 employs a quarter-wave dipole antenna as the antenna 52, but any type of antenna could be employed. In another embodiment, the antenna 52 is a phased-array antenna, which enables the interrogator 36 to determine the direction of the RF tag 38 relative to the interrogator. By determining both the direction and distance of the RF tag 38 relative to the interrogator 36, the interrogator accurately determines the location of the RF tag 38.

Figure 4:
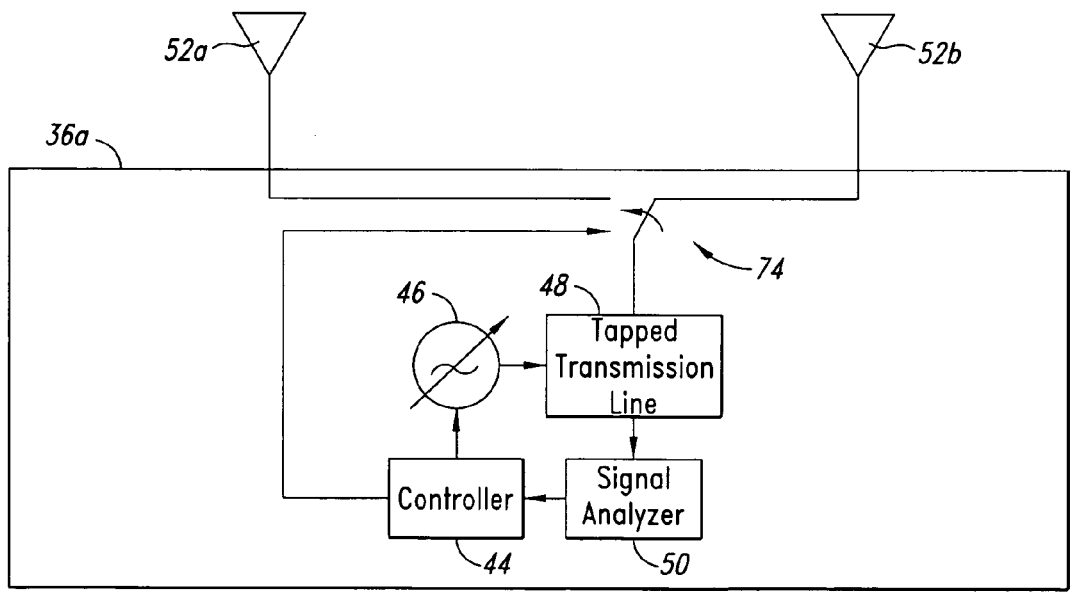
FIG. 4 is an alternate embodiment of an interrogator for use in the system of FIG. 2.

Shown in FIG. 4 is an alternate interrogator 36A that can determine the direction and distance of the RF tag 38 relative to the interrogator 36A without employing a direction-determining antenna like the phased-array antenna. Instead, the interrogator 36A employs first and second antennas 52A, 52B that are each connected by an antenna switch 74 to the same tapped transmission line 48 as in the interrogator 36 of FIG. 2. To determine the location (distance and direction) of the RF tag 36, the interrogator 36A determines first and second distances from the first and second antennas 52A, 52B, respectively, to the RF tag according to the same scheme as described above. That is, the interrogator 36A first transmits the first and second signals via the first antenna 52A, the RF tag 38 counts the nulls in the mixed signal output from the mixer 70, and the controller 44 calculates the first distance; and then the process is repeated using the second antenna 52A to determine the second distance. The controller 44 controls which antenna 52A, 52B is used at a time by controlling the antenna switch 74. The controller 44 uses the first and second distances and the known distance between the two antennas 52A, 52B to compute the location of the RF tag 38 using simple geometry.

Figure 5:
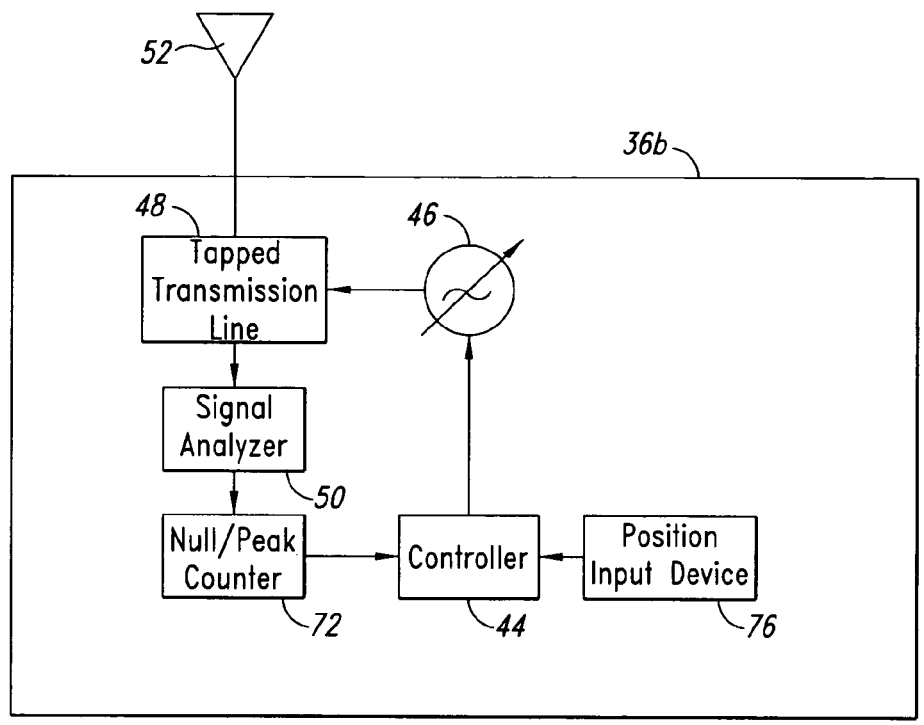
FIG. 5 is an alternate interrogator for locating an RF tag according to a further embodiment of the present invention.

Shown in FIG. 5 is another alternate interrogator 36B that can locate (distance and direction) the RF tag 38 or any prior art RF tag without modifications to the prior art RF tags. The interrogator 36B includes, in addition to the same elements 44-52 of the interrogator 36 of FIG. 2, a position input device 76, and the null/peak counter 72. The position input device 76 inputs to the controller 44 the positions of the interrogator 36B at two different locations. The interrogator 36B takes a distance measurement to the RF tag at each of the two different locations of the interrogator and uses those distance measurements, together with the position information provided by the position input device 76, to compute the location of the RF tag. The position input device can be a simple keyboard or other device through which a user inputs the position of the interrogator or it can be an accelerometer or other device that measures a position change from a first location to a second location of the interrogator. Alternatively, the interrogator 36B can be moved between two locations for which position information is pre-programmed into the controller 44 to avoid having to input new position information with each distance determination.

By incorporating the null/peak counter 72 in the interrogator 36B rather than in the RF tag 38, the interrogator 36B can determine the location of any RF tag. In the distance determination mode, the controller 44 causes the variable signal source 46 to transmit the first and second signals 40, 42 via the antenna 52. The RF tag reflects and modulates the first and second signals 40, 42. The modulation is done to distinguish the RF tag from other objects such as metal cans or other reflecting objects. The reflected first signal 40 is received by the antenna 52 and mixed with the second signal 42 by the tapped transmission line 48. The null/peak counter 72 counts the nulls or peaks in the mixed signal output by the tapped transmission line 48 and the controller 44 determines a first distance between the interrogator 36B and the RF tag based on the null or peak count. It should be appreciated that the distance determination algorithm used by the controller must compensate for the fact that the total path length of the communication is now out and back.

The user then moves the interrogator 36B to a second location and the process is repeated to determine a second distance between the interrogator 36B and the RF tag. The controller 44 determines the location of the RF tag based on the first and second distances and on the interrogator location information provided by the position input device 76. To facilitate its movement, the interrogator 36B, like the interrogators 36, 36A, can be provided as a hand-held device.

Although the embodiments shown in FIGS. 2-5 show the interrogators 36, 36A, 36B incorporating the variable signal source 46, it should be appreciated that the roles of the interrogator and the RF tag can be completely reversed. That is, the RF tag could transmit the first and second signals to the interrogator, and either the interrogator or the RF tag could perform any of the distance determination functions. In may be preferable to incorporate many or all of the distance determination functions on the interrogator to keep the size of the RF tag to a minimum, but it is not essential to the invention.

In accordance with another embodiment of the invention, a multi-channel interrogator or receiver can be used where the phase information between multiple channels can be used with two or more successive readings in time or in frequency or in relative distance to determine a real distance or a position or location, or a relative movement of a tag or any combination of the foregoing. Moreover, the system can be used to determine if a multi-path null has occurred to decide to use or not to use this information when determining distance by other means. In addition, other information can be used such as a null in either direction, field strength estimation, backscater intensity, and ramping power to determine relative distance. In addition, two or more successive readings in time or frequency or relative distance can be made of the phase information on multiple channels to determine the relative field in front of a reader antenna by having a tag of known position modulate or having an antenna of known position modulate.

Moreover, a combination of the above is also provided where a tag is powered in the standard UHF fashion at a single frequency at a time and where a lower power signal that is spread spectrum in nature or UWB is used to take a near-instantaneous snapshot of the data showing quadrature nulls. The plot so taken can contain much if not all of the data for determining distance or position or delta in relation to the standard ranging position using quadrature nulls. The foregoing is described in more detail below.

The detected backscatter modulation intensity from an RFID transponder is determined by a number of factors, including, but not limited to, transmitted power by the interrogator, antenna gain (both interrogator and transponder), relative antenna orientation, distance between the transponder and the interrogator, frequency, and the receiver design. As described herein, multi-channel receiver architectures are used for range and bearing determination between an RFID interrogator and a selected transponder or closely spaced group of transponders.

In describing a preferred embodiment of this aspect of the invention, it is to be understood that the use of only two-channel receivers is for illustrative purposes only, and additional channels may be used for increased accuracy where similar physics will apply. For example, a 3-channel system would have 60 degrees between channels instead of the 90 degrees between two channels when the signals pass through a quadrature null every 180 degrees.

Figure 6:
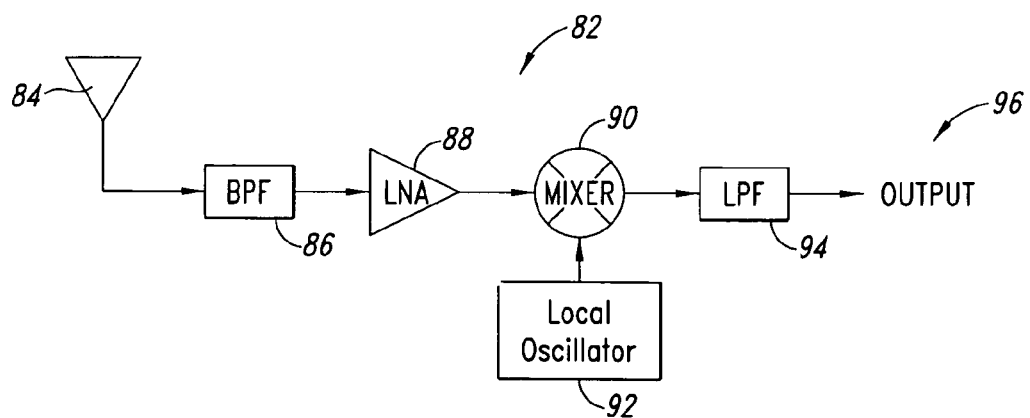
FIG. 6 is a simplified block diagram of a homodyne receiver circuit.

Referring to FIG. 6, shown therein is a simplified block diagram of a homodyne receiver 82 in which an incoming RF signal is received on an antenna 84 and processed by a bandpass filter 86. The filtered signal then passes through a low noise amplifier 88 and is combined with the output of a local oscillator 92 at a mixer 90. A lowpass filter 94 receives the output from the mixer 90 where the resulting base band signal is filtered to select a desired channel on the output 96. The main advantage of a homodyne receiver is that the incoming RF signal is down-converted directly to base band without any intermediate frequency stage. As a result, this architecture is simple and does not require any high-frequency bandpass filter, thus requiring fewer components, especially external components.

Figure 7:
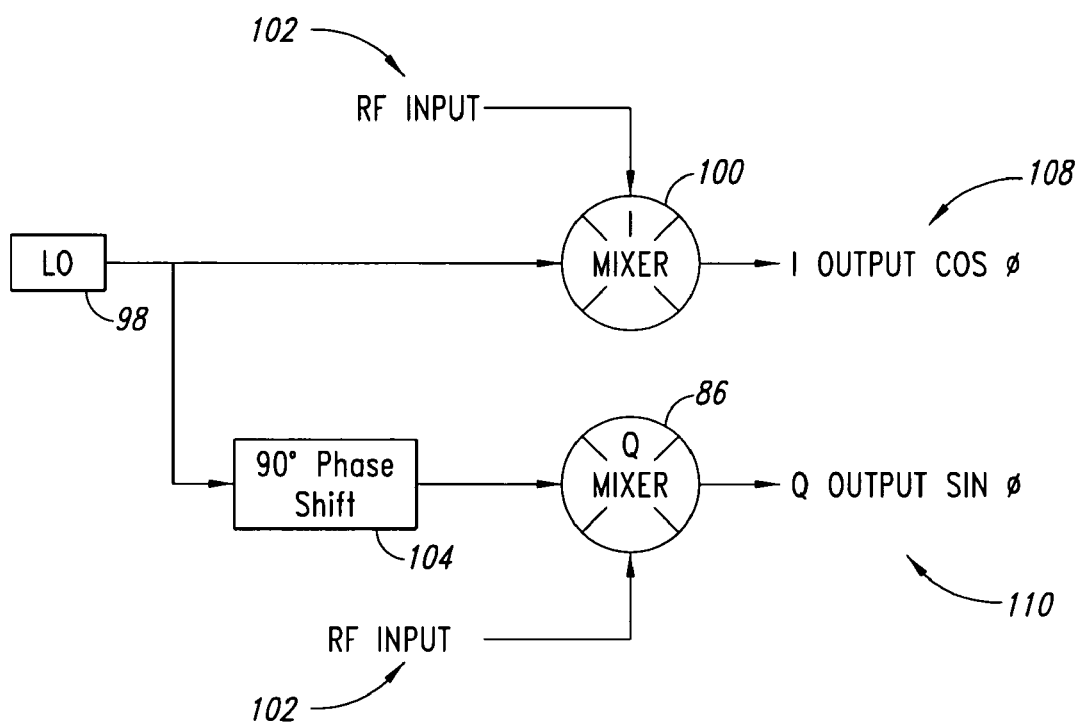
FIG. 7 is a simplified block diagram of in-phase and quadrature signal generation circuit.

Unlike a heterodyne system, where a single mixer is used for down conversion, a homodyne receiver uses two mixers as shown more clearly in FIG. 7. Here, a local oscillator 98 is shown generating a first output received at a first mixer 100, which also receives as input the RF signal 102. The output from the local oscillator 98 also passes through a 90-degree phase shifter 104, the output of which is fed to a second mixer 106 that also receives the RF input 102. The output from the first mixer, denoted in FIG. 7 as the "I mixer," is the in-phase I output 108, whereas the output 110 from the "Q mixer" 106 is quadrature or Q output 110 that is 90 degrees out of phase from the I output 108.

Thus, in operation, the received signal 102 is split and fed into both mixers. The RF signal drives the first mixer 100 to generate the in-phase output 108 and the RF signal 102 drives the "Q mixer" 106 to generate the 90-degree out-of-phase Q output 110 In the I output 108, the amplitude will drop to zero when the phase angle is 90 degrees plus a multiple of pi radians of the signal because a cosine of those angles is equal to zero. In the Q output 110, the amplitude falls to zero whenever the phase angle is a multiple of pi because the Q output 110 is merely the I output 108 shifted by 90 degrees. When these outputs are combined or summed, their outputs will have periods of signal cancellation or quadrature nulls. Movement of the device sending the RF signal, such as an RFID transponder, can change the relationship of these signals and hence the intensity, duration, and frequency of the nulls.

The Airy function for a Fabry-Perot etalon can be modified to describe quadrature backscatter amplitude by subtracting the normal expression for cavity transmission from one and appropriately scaling the phase rotation.

The reflectivity term (R) is related to the antenna gains of the tag and transceiver as well as the signal strength and amplifier characteristics:

$$Sig = 1 - T = 1 - \left[1 + \frac{4R}{(1-R^2)} \sin^2(\phi)\right]^{-1}$$

where:

Sig=Detected Backscatter Signal Amplitude

T=Fabry-Perot Etalon Transmission Function

R=The Reflectivity of the Mirrors used in the Fabry-Perot Etalon. As applied to backscatter modulation, this term is related to Antenna Gains for the Reader and the Tag, Amplifier Characteristics.

phi=an angular term used in the expression that is a function of distance, wavelength and the angular dispersion of the beam (expression given in the text).

The phase change is a function of distance, wavelength and the dispersion of the beam.

$$\phi = \frac{4\Pi n d}{\lambda} \cos(\theta)$$

where:

d=effective distance in meters lambda=wavelength of the RF carrier in meters n=the refractive index of the transmission medium.

Vacuum/Air~1.0.

(Theta can be set to zero as a first approximation.)

Nulls in this expression occur at periodic frequencies. Null spacing follows the modified expression for an etalon's free spectral range:

$$\Delta_\nu (\text{frequency}) = \frac{c}{4nd}$$

where:

c=speed of light in meters.

Example calculations follow in conjunction with the signal intensity-frequency and null spacing-distance plots of FIGS. 8-12.

Figure 8:
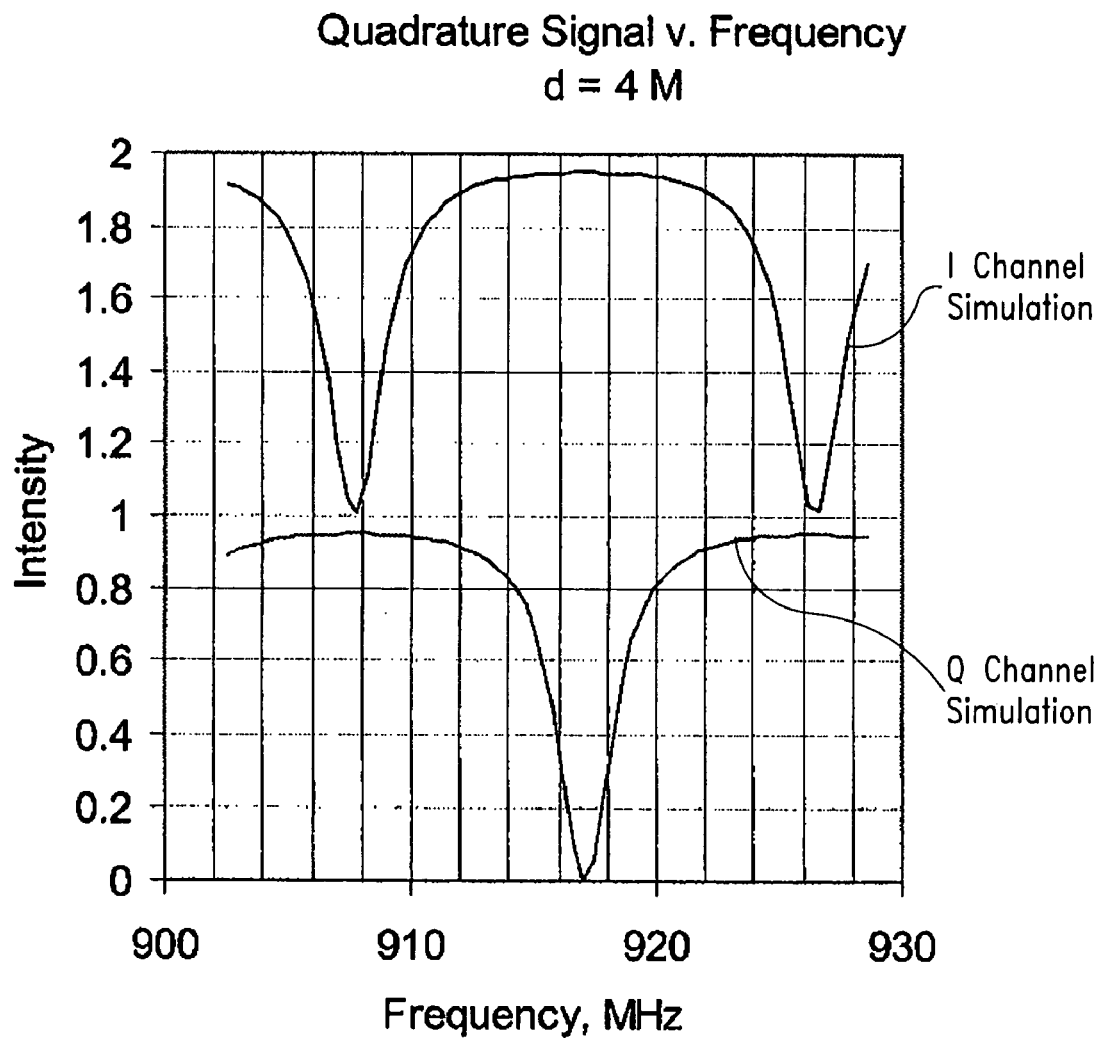
FIG. 8 is a plot of I and Q output strength at a distance of 4 meters.
Figure 9:
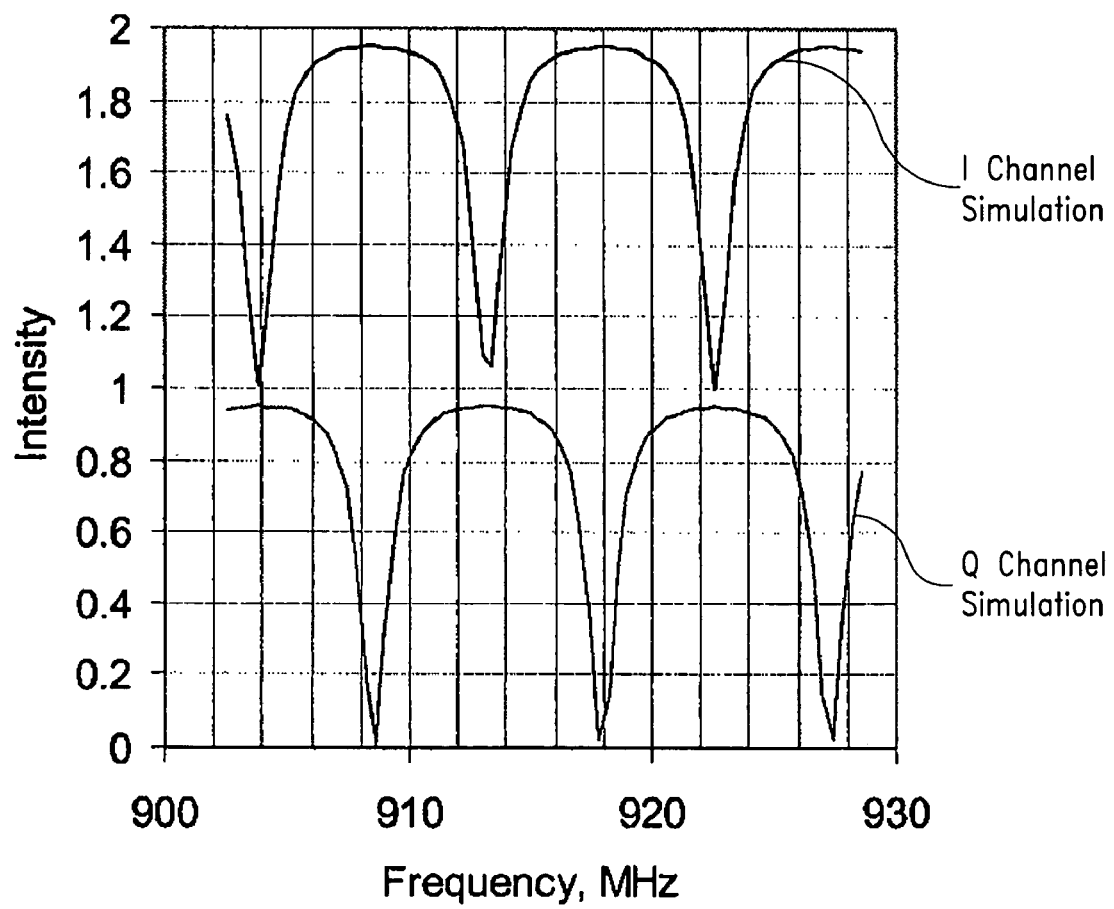
FIG. 9 is a plot of I and Q output strength at a distance of 8 meters.
Figure 10:
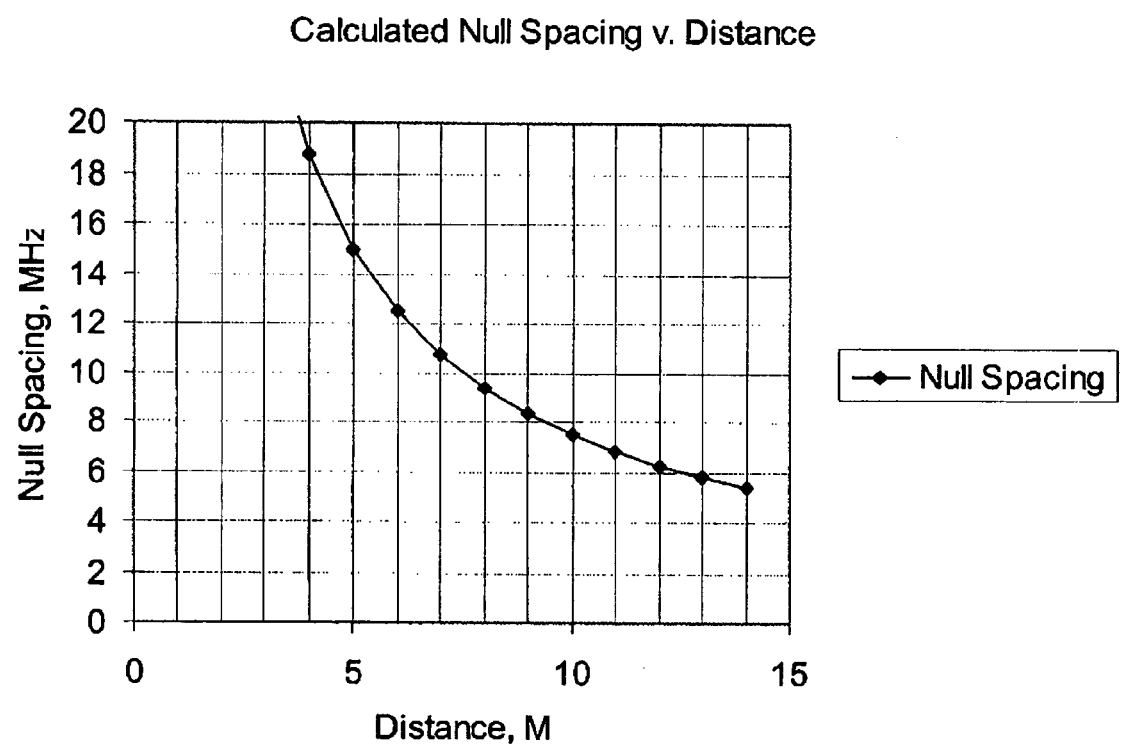
FIG. 10 is a plot of calculated null spacing in frequency with respect to distance.

More particularly, predicted I/Q signal strength as a function of frequency is shown in FIGS. 8 and 9 for distances of 4 and 8 meters respectively. The null spacing in MHz and calculated distance is shown in FIG. 10.

The distance d can be determined from the null spacing via the free spectral range equation above. The null spacing is a function of the distance to the tag.

Figure 11:
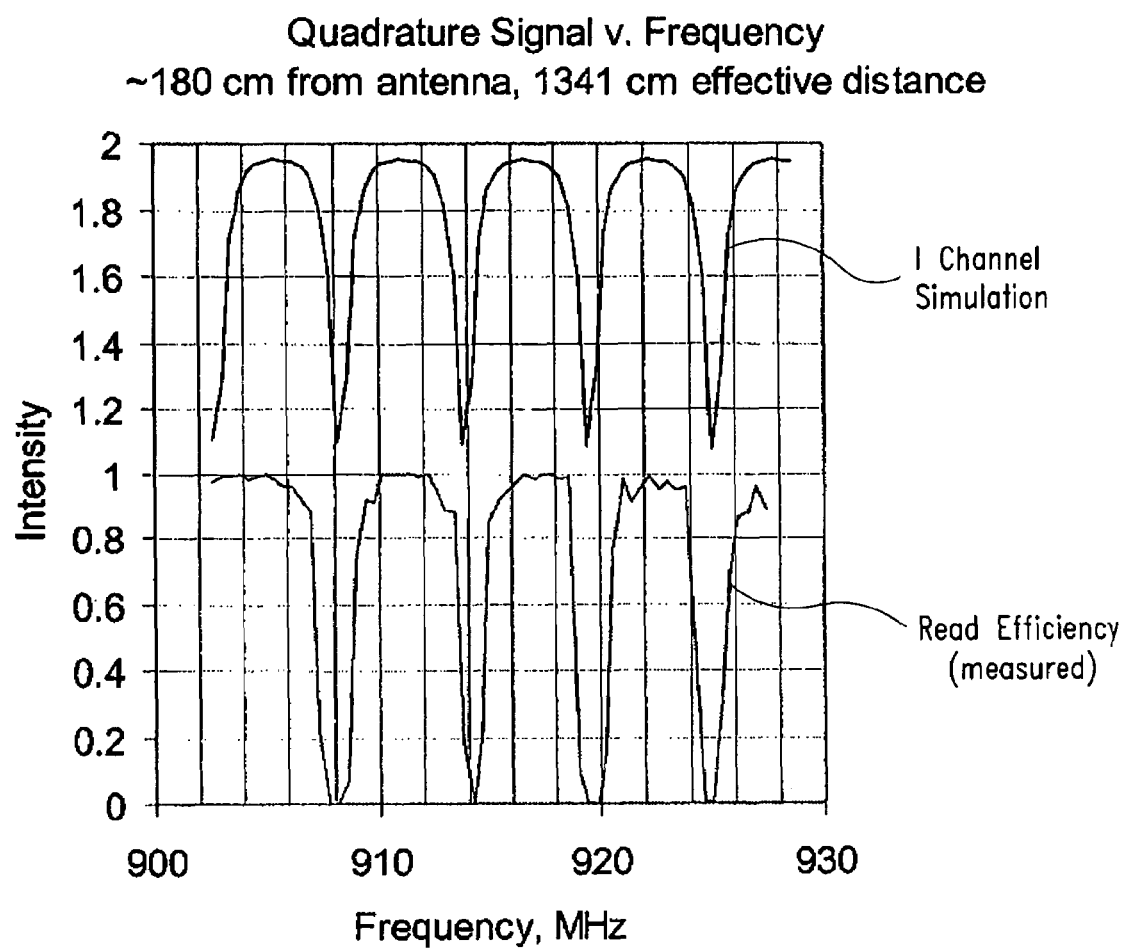
FIG. 11 is a plot of in-phase signal strength for a tag 1.8 meters from an antenna and with a 20-foot cable.

Shown in FIG. 11 is a plot for a tag 1.8 meters from an antenna with a 20-foot cable. Here the observed null spacing is substantially closer than that predicted by a 1.8 Meter spacing. The effective distance to the tag is on the order of 13 meters.

Figure 12:
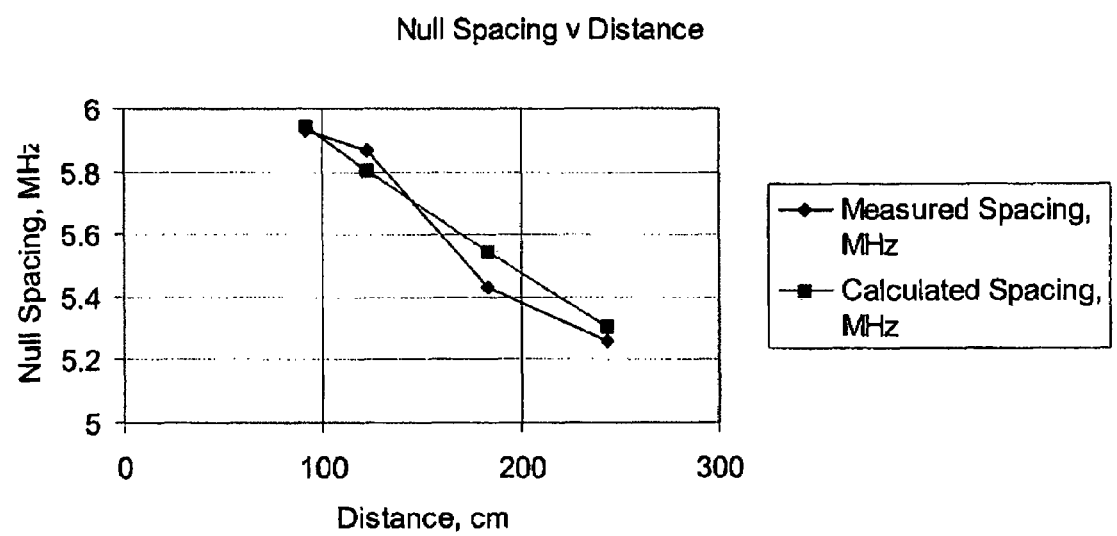
FIG. 12 is a plot of null spacing with respect to distance for the tag of FIG. 11.

The predicted phase change, with distance from the antenna, maps well with the experimental data modified by the effective length of the cable, as shown in FIG. 12.

A disadvantage of this scheme is there is no a priori knowledge of the null position so a series of frequencies must be tested. This can be time consuming.

Figure 13:
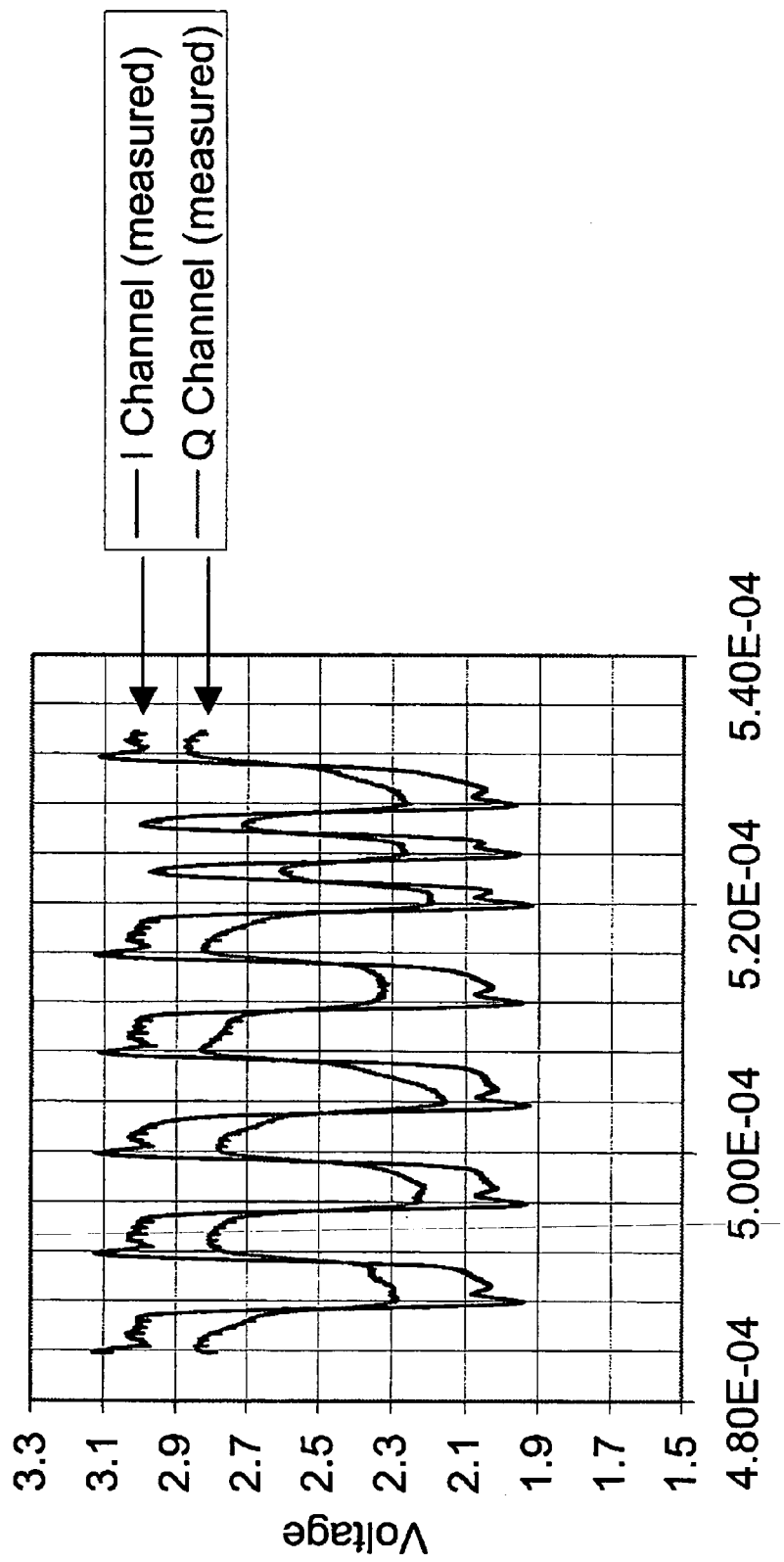
FIG. 13 is a plot of I and Q signals in response to a masked scroll command.

A different way to resolve the problem is to analyze a phase rotation of the I-Q Vector. FIG. 13 illustrates an example of the base band in-phase (I) and quadrature (Q) signal from a portion of a tag response to a "masked scroll" command.

As shown therein, the channels are in fair relative phase with each other. At various times each will be inverted with respect to each other. As each of these signals pass through quadrature nulls, either through motion at a fixed frequency or through a frequency change at a fixed distance, the amplitude of the voltage passes through zero. The 90-degree delay in the homodyne receiver design ensures that as one channel passes through a null, the other channel is at maximum signal intensity. The sense of this signal inverts every quarter wavelength. An important aspect of this is the characteristic inversion of the data that occurs after the quadrature null and the relative phase before and after in relation to the other channel.

Figure 14:
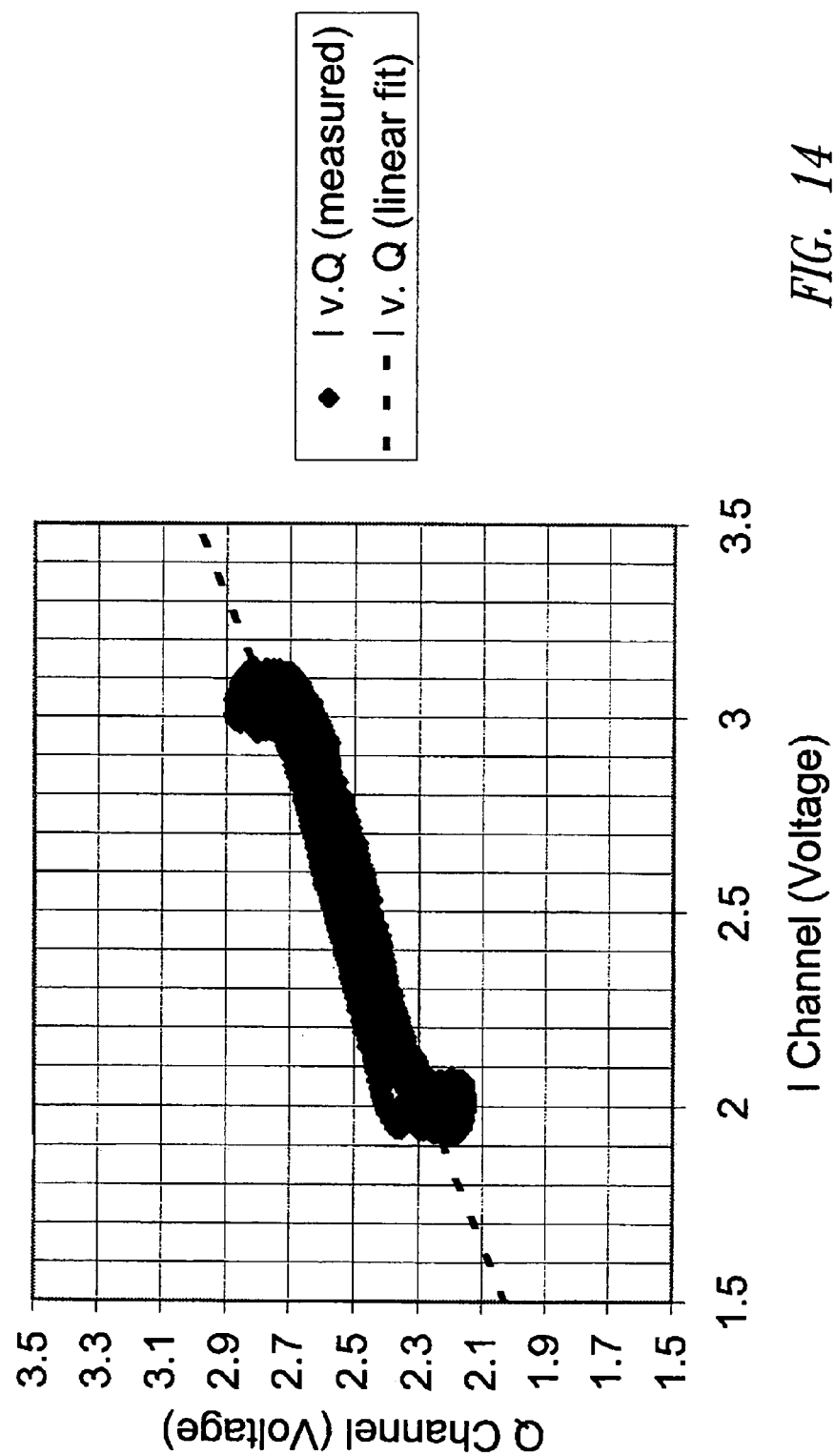
FIG. 14 is a plot of the phase angle relationships of the I and Q signals.

FIG. 14, which is a plot of the I data against the Q data from FIG. 12, shows a vector with a characteristic phase angle. As frequency or distance changes, this vector rotates. The direction of the rotation is determined by whether the frequency is increasing or decreasing or if the direction of travel is towards or away from the antenna. Here, y=0.4836×1.3005 with the correlation coefficient for the linear fit of the I channel data versus the Q channel data being $R^2$=0.9377.

Figure 15:
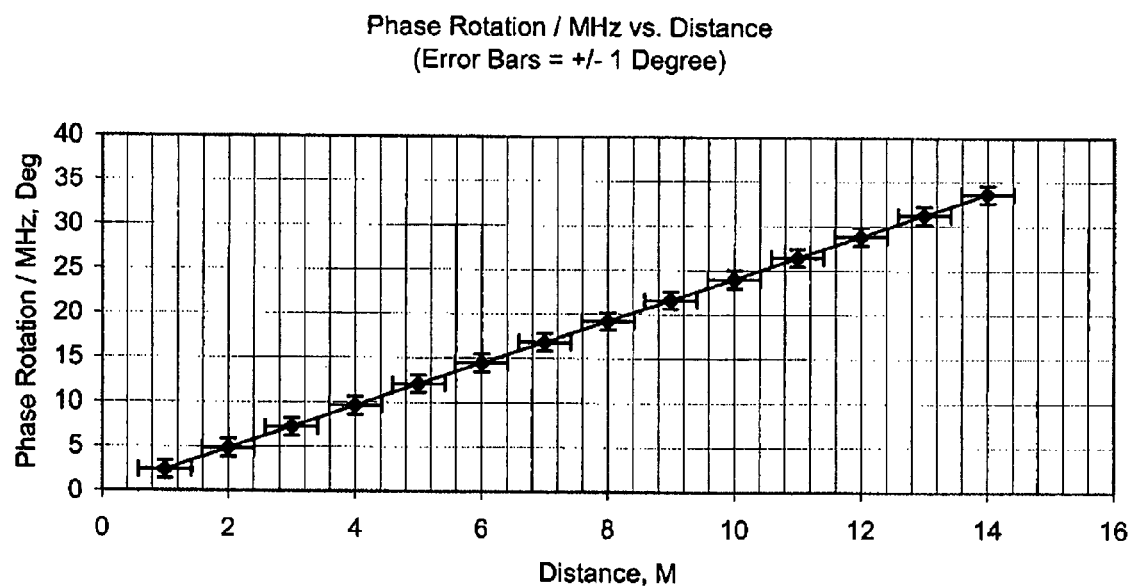
FIG. 15 is a plot of the phase angle rotation/MHz with respect to distance.

The magnitude of the rotation is calculated from the expression for free spectral range as discussed above. A given channel passes through a minimum for every 180 degrees of rotation of the I/Q vector. The magnitude of this rotation as a function of frequency change, $$\frac{\Delta \theta}{\Delta \omega},$$

is a linear function of distance, as shown in FIG. 15.

For differences in frequency less than the current free spectral range, the distance can be measured by comparing the angles of the I-Q vectors at two frequencies.

Signal to noise and linearity of the amplification are important for this approach to be successful as the measured distance is a strong function of the angle change. The error bars shown therein are for a 1-degree uncertainty in the angle of the I-Q vector.

In theory, with sufficient signal to noise, the rotation of the I-Q vector could be used to find the distance to a tag very quickly. A common data rate available under U.S. regulations commands to takes can take less than 2 msec to execute. To find the approximate distance to the tag, one could move to a frequency, issue a command that causes a tag response, move to another frequency, issue another similar command that causes another tag response, and compare the change in I-Q phase angle. This could take about 10 msec to complete with certain frequency hopping schemes.

It is to be understood that multi-path nulls both of field strength and otherwise add error to this approach. It is also known that in using a CP antenna the relative phase reverses after a reflection. Using this approach and mapping this reversal in conjunction with the above can be used to determine the validity of nulls arrived at in the data returned to the reader.

In an embodiment, the present invention discloses a method of determining a positional relationship between a radio frequency signal source and a multi-channel receiver, comprising: receiving at the multi-channel receiver a first signal from the signal source that is at a first frequency; issuing a first global scroll command to obtain a first I-Q signal vector; receiving at the multi-channel receiver a second signal from the signal source that is at a second frequency; issuing a second global scroll command to obtain a second I-Q signal vector; and comparing the first and second I-Q vectors and calculating the positional relationship distance between the signal source and the multi-channel receiver. In an aspect, issuing the first and second global scroll commands comprises issuing a masked scroll command.

The foregoing method of the present invention can be implemented in a variety of systems, particularly for RFID applications, including but not limited to the following:

a) An RFID system with a multi-channel receiver where the phase information relative between the multiple channels can be used with two or more successive readings in time or in frequency or in relative distance to determine real distance to the tag.

b) An RFID system with a multi-channel receiver where the phase information relative between the multiple channels can be used with two or more successive readings in time or in frequency or in relative distance to determine position of the tag by using antenna vectoring, multiple antennas or characteristics of an antenna pattern.

c) An RFID system with a multi-channel receiver where the phase information relative between the multiple channels can be used with two or more successive readings in time or in frequency or in relative distance to determine the vector to the tag by using antenna vectoring, multiple antennas or characteristics of an antenna pattern.

d) An RFID system with a multi-channel receiver where the phase information relative between the multiple channels can be used with two or more successive readings in time or in frequency or in relative distance to determine if the tag is coming toward or away from the antenna.

e) An RFID system with a multi-channel receiver where the phase information relative between the multiple channels can be used with two or more successive readings in time or in frequency or in relative distance to determine if a multi-path null has occurred to decide to use or not use this information when determine distance by other means.

f) An RFID system with a multi-channel receiver where the phase information relative between the multiple channels can be used with two or more successive readings in time or in frequency or in relative distance to determine position of the tag and using this relative phase information in conjunction with other information such as null in either direction, field strength estimation, backscatter intensity, and ramping power to the tag to determine relative distance.

g) An RFID system with a multi-channel receiver where the phase information relative between the multiple channels can be used with two or more successive readings in time or in frequency or in relative distance to determine the relative field in front of a reader antenna by having a tag of known position modulate or having an antenna of known position modulate.

h) A combination of the above where a tag is powered in the standard UHF fashion at a single frequency at a time and where a lower power signal which is spread spectrum in nature or UWB is used to take a near instantaneous snapshot of the data showing quadrature nulls. The plot so taken contains much if not all of the data for determining distance or position or delta in both related to the standard ranging position using quadrature nulls.

Existing hardware configurations disclosed in this application can be used to implement the foregoing embodiment. The analysis of phase changes can be made in firmware in the receiver microprocessor that acquires data from the tag and controls the interrogation signal frequency. By evaluating the phase null behavior on the I and Q Channels or by examining the way the phase angle rotates as frequency is changed, the microprocessor in the reader can determine distance as described above.

In view of the foregoing, it will be appreciated that the RF communication systems and methods discussed herein provide important advantages over prior systems. By providing the ability to locate an RF tag, and any object attached to the RF tag, the disclosed RF communication systems greatly extend the range of applications to which RF tag technology can be applied. For example, the RF communication system discussed above can be employed to locate lost weapons on a battlefield, animals across a large property, and any inventory object within a warehouse.

Finally it will be clear that many modifications and variants may be introduced to the inventive embodiments described and illustrated herein, all of which come within the scope of the invention as defined in the accompanying claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A method of determining distance between a signal source and a multi-channel signal receiver, the method comprising:

obtaining successive readings on each of a plurality of different channels of the multi-channel receiver of a signal transmitted from the signal source;

measuring phase information from the readings of the plurality of different channels on the successive readings to generate measured phase information; and determining a relationship between the receiver and the signal source by using the measured phase information, the relationship comprising actual distance between the signal source and the multi-channel receiver.

2. The method of claim 1 wherein obtaining successive readings of the signal comprises obtaining successive readings in one from among time, frequency, and relative distance between the signal source and the multi-channel receiver.

3. The method of claim 2, wherein determining a relationship comprises using one from among antennae vectoring, multiple antennas, and characteristics of an antenna pattern.

4. The method of claim 2, wherein determining a relationship comprises determining a vector to the signal source.

5. The method of claim 2 wherein determining a relationship comprises determining whether the signal source is moving towards or away from the multi-channel receiver.

6. The method of claim 2 wherein determining a relationship comprises determining if a multi-path null has occurred in order to decide whether to use or not use another method in determining the actual distance.

7. The method of claim 2 wherein determining a relationship comprises determining a position of the signal source and using relative phase information in conjunction with at least one from among a null in either direction, field strength estimation, backscatter intensity, and ramping power to the signal source to determine relative distance.

8. The method of claim 2 wherein determining a relationship comprises determining a relative field in front of an antenna of the multi-channel receiver by having a signal source of known position modulate a signal to the multichannel receiver or by having an antenna of known position modulate a signal to the multi-channel receiver.

9. The method of claim 1 wherein the signal source comprises an RFID tag powered by a UHF signal at a single frequency at a time where a lower power signal that is spread spectrum in nature or that is UWB is used to obtain data regarding quadrature nulls in the signal received from the signal source in order to determine at least one from among actual distance between the signal source and the multi-channel receiver, and a position of the signal source, a change in actual distance, and a change in the position of the signal source.

10. A radio frequency communication system comprising:
a multi-channel receiver configured to receive a signal transmitted from a signal source, the receiver configured to determine a relationship between the multi-channel receiver and the signal source by using measured phase information relative between each of multiple different channels of the multi-channel receiver taken with two or more successive readings of the signal on each of the multiple different channels of the multi-channel receiver, the relationship comprising actual distance.

11. The system of claim 10 wherein the receiver is configured to obtain two or more successive readings in at least one from among time, frequency, and relative distance between the signal source and the receiver.

12. The system of claim 11, wherein the receiver is configured to determine actual distance by using the phase information with at least one from among antenna vectoring, multiple antennas, and characteristics of an antenna pattern.

13. The system of claim 12 wherein the receiver is configured to determine a vector to the signal source by using the phase information.

14. The system of claim 11 wherein the receiver is configured to determine if the signal source is moving towards or away from the receiver by using the phase information.

15. The system of claim 11 wherein the receiver is configured to determine if a multi-path null has occurred in order to decide whether to use or not use another method in determining the actual distance.

16. The system of claim 11 wherein the receiver is configured to use relative phase information in conjunction with at least one from among a null in either direction, field strength estimation, backscatter intensity, and ramping power to the signal source to determine a relative distance between the signal source and the receiver.

17. The system of claim 11 wherein the receiver is configured to determine a relative field in front of an antenna of the receiver by having a signal source of known position modulate a signal to the multi-channel receiver or by having an antenna of known position modulate a signal to the multi-channel.

18. The system of claim 11 wherein the signal source comprises an RFID tag powered by a UHF signal at a single frequency at a time where a lower power signal that is spread spectrum in nature or that is UWB is used to obtain data regarding quadrature nulls in the signal received from the signal source in order to determine at least one from among actual distance between the signal source and the multi-channel receiver, and a position of the signal source, a change in actual distance, and a change in the position of the signal source.

19. A method of determining distance between a radio frequency signal source and a multi-channel receiver, comprising:
receiving at the multi-channel receiver a radio frequency signal transmitted from the signal source;
determining a change in phase angle relationship between a base band in-phase signal measured at a first channel of the multi-channel receiver and a quadrature signal measured at a second channel of the multi-channel receiver, each measurement obtained from the received radio frequency signal on each of the first and second channels of the multi-channel receiver; and
calculating a distance between the signal source and the receiver in response to the determined change in phase angle relationship.

20. The method of claim 19 wherein determining a change in the phase angle relationship comprises measuring change in a vector of the phase angle relationship.

21. The method of claim 20 wherein measuring the change in the vector comprises measuring a change in a magnitude and direction of rotation of the determined phase angle relationship.

22. The method of claim 21 wherein the determined phase angle relationship comprises in-phase and quadrature vectors and calculating the distance comprises comparing the angles of the in-phase and quadrature vectors at two different frequencies.

23. A method of determining a positional relationship between a radio frequency signal source and a multi-channel receiver, comprising:
receiving at the multi-channel receiver a first signal from the signal source that is at a first frequency;
issuing a first global scroll command to obtain a first I-Q signal vector;
receiving at the multi-channel receiver a second signal from the signal source that is at a second frequency;
issuing a second global scroll command to obtain a second I-Q signal vector; and
comparing the first and second I-Q vectors and calculating the positional relationship distance between the signal source and the multi-channel receiver.

24. The method of claim 23 wherein issuing the first and second global scroll commands comprises issuing a masked scroll command.

25. A system, comprising:
- a variable frequency signal source that produces a first signal at a first frequency and a second signal at a second frequency;
- a multi-channel receiver for receiving the first and second signals and for determining a positional relationship between the signal source and the multi-channel receiver, the multi-channel receiver comprising means for comparing a change in vectors of I-Q phases obtained from two or more different channels of the multi-channel receiver of the first and second signals.

26. The system of claim 25, wherein the positional relationship comprises at least one from among distance, relative movement, and position.

* * * * *

UNITED STATES PATENT AND TRADEMARK OFFICE
CERTIFICATE OF CORRECTION

PATENT NO. : 7,580,378 B2  Page 1 of 1
APPLICATION NO. : 11/080379
DATED : August 25, 2009
INVENTOR(S) : Carrender et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1009 days.

Signed and Sealed this

Fourteenth Day of September, 2010

David J. Kappos
*Director of the United States Patent and Trademark Office*